Figure 1:
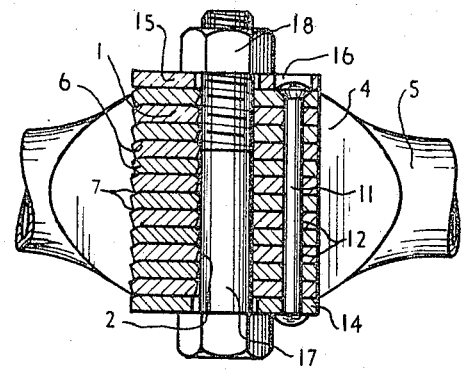

March 14, 1967     A. E. FENTIMAN     3,309,121

KEYWAY TYPE CONNECTOR

Filed Aug. 7, 1964     2 Sheets-Sheet 1

INVENTOR
ARTHUR E. FENTIMAN

ATTORNEYS

March 14, 1967 A. E. FENTIMAN 3,309,121
KEYWAY TYPE CONNECTOR
Filed Aug. 7, 1964 2 Sheets-Sheet 2

INVENTOR
ARTHUR E. FENTIMAN
ATTORNEY

United States Patent Office 3,309,121
Patented Mar. 14, 1967

3,309,121
KEYWAY TYPE CONNECTOR
Arthur E. Fentiman, Stittsville, Ontario, Canada, assignor to Triodetic Structures Limited, Ottawa, Ontario, Canada
Filed Aug. 7, 1964, Ser. No. 388,154
3 Claims. (Cl. 287—189.36)

This invention relates to improvements in a keyway type connector and appertains particularly to one of novel form designed to releasably receive the formed end of one or more complementary structural members.

For structural, engineering and other assemblies utilizing hub-like connectors releasably holding formed ends of members extending therefrom, I have heretofore favoured the employment of a keyway type of connector of unitary form, with or without extraneous fastening items, as I had found these could be made of chopped off extrusions of aluminum or the like and produced easily, rapidly and economically. For some types of work, assemblies or installations it is now found desirable to utilize other materials such as steel that may not be easily or cheaply extruded so I now propose to construct a novel connector of composite form.

Accordingly, it is an object of this invention to provide a connector of composite form consisting of a stack of connector-constituting elements.

It is a further object of this invention to provide a connector of composite form enabling the use of such varying number of stacked elements as may be required to build up a connector of the wanted overall size or length.

A further object of the invention is to provide a composite connector, of the nature and for the purpose described, in which the constituent parts of the stack may be all of one or two or more materials as for example all steel parts or alternate steel and plastic or paper parts, or such a variety of materials and spacing of the constituent parts as its size and the nature of its intended use may call for.

A still further object of the invention is to provide a composite keyway type connector comprising a stack of such number of preformed and matched or suitably related elements as required to receive and hold one or more radiating or divergent structural elements or sets of elements of selected size extending therefrom.

A still further object of the invention is to provide a composite connector comprising a stack of preformed elements of such conguration as to facilitate their rotative positioning to bring their matched or related parts into alignment or registry.

A still further object of the invention is to provide a composite connector comprising a stack of a selected number of preformed, matched or related elements held together in a single assembly for easy handling.

A still further object is to provide a composite connector comprising a stack of matched or related elements that admit of simple, rapid production as mass press stampings.

A still further object of the invention is to provide a connector including a primary hub part, that may be formed of a stack of preformed and matching constituent elements as described, together with a conical end part connected thereto, the primary hub part securing members radiating in a common plane and the conical end part securing members radiating at an angle to the first members.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

Figure 2:
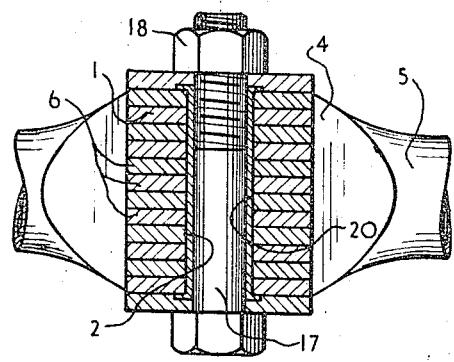
Figure 3:
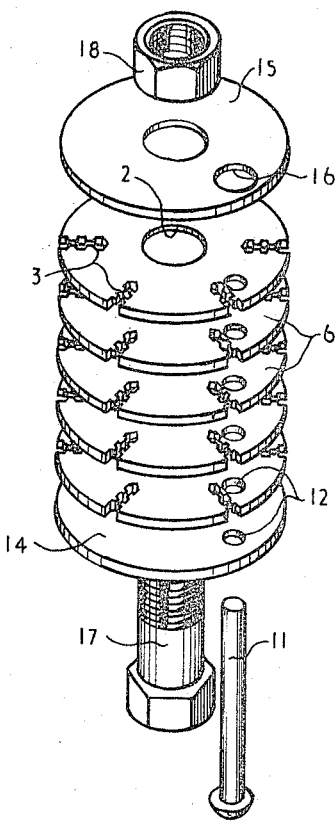
Figure 4:
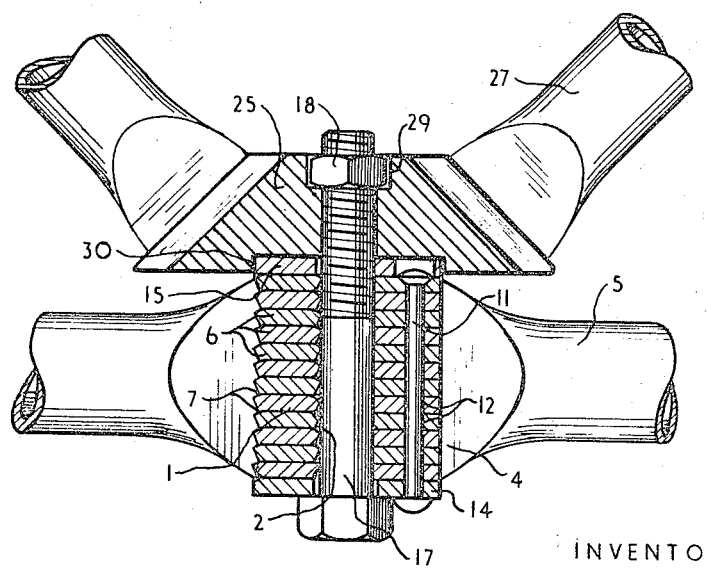
Figure 6:
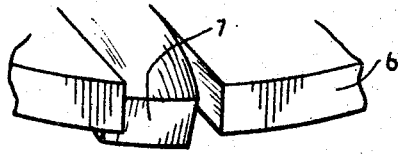
Figure 8:
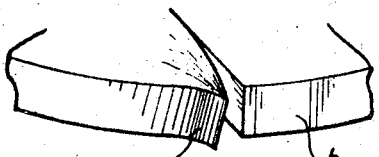
Figure 7:
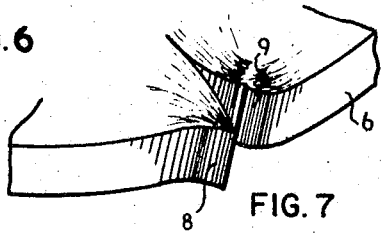
Figure 5:
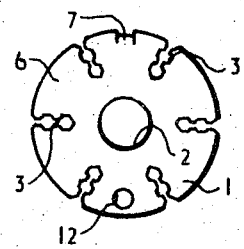
Figure 9:
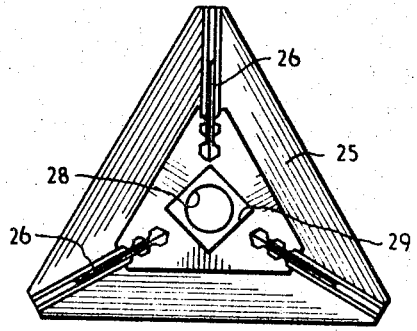
Figure 10:
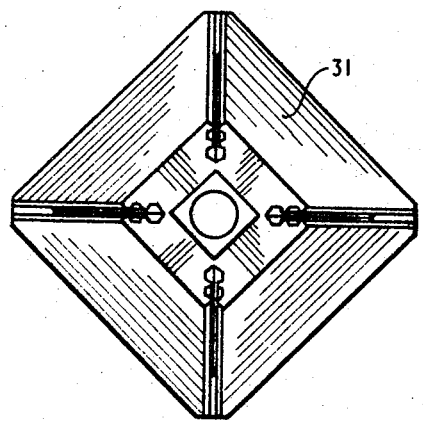
Figure 11:
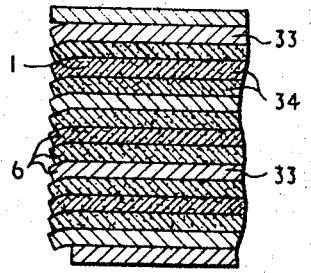

In the drawings:
FIGURE 1 is a vertical section of a composite keyway type connector;
FIGURE 2 is a similar vertical section of a modified composite connector;
FIGURE 3 is an exploded, perspective view of the connector seen in FIGURE 1;
FIGURE 4 is another section of a two-part connector, whose primary connector part is similar to that seen in FIGURES 1 and 3;
FIGURE 5 is a plan view of one of the washer-like component elements of the connector shown in FIGURES 1, 3 and 4;
FIGURE 6 is an enlarged perspective detail of the displaced peripheral tooth of the element shown in FIGURE 5;
FIGURES 7 and 8 are similar perspective details of modified forms of stack aligning peripheral teeth;
FIGURE 9 is a plan of the conical end part of the two-part connector shown in FIGURE 4;
FIGURE 10 is a similar plan of a modified form of conical end part; and
FIGURE 11 is a vertical sectional detail of a modified stack of washer-like components.

The extruded connector I commonly employ is a hub-like element, with or without an axial bore, and having a plurality of circumferentially spaced, radially disposed slots open to the periphery and of the full length of the hub, the slots being fashioned as longitudinally extending keyways open at the ends of the hub to receive the complementary formed ends of diverging structural elements such as arms or the like. Various forms of such hubs, connectors or joints are disclosed in my prior patents, 2,895,753, "Joint"; 2,931,467, "Structural Framework"; 2,964,147, "Truss and Components Therefor"; and 3,079,681, "Joint and Method of Forming Same."

In this invention, as will be noted on reference to FIGURES 1 to 5 inclusive, the complete hub or connector 1 is of the same general elongated cylindrical contour, with a central bore 2 and a plurality of circumferentially spaced radial slots 3 fashioned as parallel longitudinally extending keyways, running the full length of the hub and open at the ends to receive the complementary formed key ends 4 of divergent structural rods 5.

The connecting cylinder 1, however, is composed of a stack of identical wafer disks or washer-like elements 6 that together constitute an elongated keyway hub. To assure the aligning of the disks 6 with the keyway slots 3 in perfect registry, an inter-engaging or nesting device such as downturned tooth 7 may be formed on the periphery, as seen in FIGURES 1, 4, 5 and 6, to facilitate rapid assembly. Alternatively, a concave-convex dimple may be used or the reversely upturned-downturned lips 8–9 or single downturned lip 10, seen in FIGURES 7 and 8 respectively.

To retain the selected number of disks 6 in a hub-forming stack, a rivet 11 is passed through aligned perforations 12 in the disks and headed. A perforated but non-slotted lower end washer 14 is also held by the rivet 11, according to the showings in FIGURES 1, 3 and 4, and a non-slotted upper end washer 15, applied to the connector hub 1 after the divergent arms 5 are inserted in the keyway slots 3, is also employed, the latter having a larger perforation 16 to overlie and accommodate the headed end of the rivet. The complete multiple disk hub 1 including the closure washers 14 and 15 is finally secured by a bolt 17 passing through the coaxial bores 2 in the keyway slotted disks 6 and non-slotted opposite end washers 14 and 15 and captured by a nut 18.

An alternative means for securing the stack of slotted keyway disks 6 in a hub assembly is seen in FIGURE 2 where a thin sleeve 20 is inserted first in the aligned axial bores 2 of the disks and flared at each end, the bores 2 being of slightly larger diameter than in the previously described forms or the bolt 17 is of slightly smaller diameter. In either case, one end washer may or may not be initially secured to the stack of slotted keyway disks as desired.

While structures of an unlimited range of designs can be assembled by use of these connectors and associated elements varied as dictated by the geometry of the particular configuration, it may be useful to describe, by way of example, a typical compound or two-part connector such as is employed in two and three-way space grids, for which purpose reference is now had to FIGURES 4, 9 and 10. The primary hub or connector 1, seen in FIGURE 4, is provided with a conical or tapered end or cap 25 with circumferentially spaced radial keyway slots 26 in its angular face for reception of the keyed ends of angularly divergent structural elements 27. This cap has a central bore 28 that aligns with the bore 2 in the main connector and allows a longer bolt 17 to pass therethrough and be captured by the nut 18, the head of the bolt or the nut being nested in a cavity 29 in the top of the cap. If desired the under side of the cap may be provided with a concentric recess 30 to accommodate the upper end of the primary connector. The connector hub 1 shown in FIGURES 1 to 5 inclusive is a six slot connector and with such a three slot cap 25 as seen in FIGURES 4 and 9 provides a suitable nine slot connector for a three-way space grid; while for an eight slot connector for a two-way space grid a primary hub with four slots and a four slot rectangular tapered cap 31 as shown in FIGURE 10 would be preferred.

The present laminated connector 1 fabricated from a plurality of wafer disks 6 arranged in a stack with their identical keyway slots aligned and suitably held in a hub-forming assembly possesses many advantages, for example, the disks may be easily, rapidly and cheaply stamped from steel or other materials in mass production, the assembly may be of steel disks only or steel disks spaced with nylon, paper or other metal disks in an endless variety to meet different needs, the assembled hub may include such number of disks as needed to provide the desired length to receive a longer or shorter keyed end according to the thickness or diameter of the diverging member, and so on. It is to be understood that the divergent members may be of any suitable size and of different cross-section as flats, solids, angles, tubes, etc.

In FIGURE 11 a detail section of a laminated connector 1 is shown in which the disks 6 are of more than one material, i.e., steel disks 33 are spaced with disks 34 of identical form but composed of plastic or the like.

The connector-forming wafer disks may be provided with such number, arrangement and size of keyway slots as the end use of the connector requires: Such means for rotatively positioning the several disks in a stack may be selected as desired including those from the various devices shown in FIGURES 1 to 8 inclusive: The rotatively positioned disks may be secured in stack form in many ways as by the rivet 11, flanged sleeve 20, shown in FIGURES 1 and 2 respectively, by adhesive or any other acceptable device.

From the foregoing description taken in connection with the accompanying drawings, it will be manifest that a keyway type connector is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. A connector for slidingly receiving the formed ends of divergent members with angularly spaced keyway slots open to at least one end, said connector comprising a plurality of disks arranged in a stack, each of said disks being preformed with peripheral keyway slots corresponding one with the other, and a turned tooth formed on the periphery of each disk to facilitate the positioning of the disks, one with the other, and to hold the same against angular turning relative to each other, and means to secure the disks together in stacked position.

2. A connector as defined in claim 1 and certain of said disks being of metal and others of said disks being of plastic or the like.

3. A connector as defined in claim 1 and a tapered cap having aligned bore and additional keyway slots disposed angularly to those in said disks and said means to secure said disks in stacked position including the tapered cap and further comprising a fastening bolt extending through said aligned bores in the disks and cap and a capturing nut adjacent the end holding the cap.

References Cited by the Examiner

UNITED STATES PATENTS 2,931,467 4/1960 Fentiman _____ 189—36
3,060,562 10/1962 Fransson _____ 189—36 X HARRISON R. MOSELEY, *Primary Examiner.*

A. I. BREIER, *Assistant Examiner.*